United States Patent [19]
Soderlund

[11] 3,777,494
[45] Dec. 11, 1973

[54] WAVE ENERGY MOTORS

[76] Inventor: Alfred Soderlund, 1014 Forest Ave., Evanston, Ill. 60202

[22] Filed: Jan. 10, 1972

[21] Appl. No.: 216,607

[52] U.S. Cl............................. 60/507, 415/7, 115/4
[51] Int. Cl. ................................................ F03c 5/00
[58] Field of Search .................. 60/22; 74/575, 577; 415/2, 3, 4, 7, 8; 114/116 E; 115/4

[56] References Cited
UNITED STATES PATENTS

| 415,812 | 11/1889 | Dowe | 60/22 |
|---|---|---|---|
| 607,072 | 7/1898 | Palmer | 60/22 |
| 978,628 | 12/1910 | Nixon | 60/22 |
| 1,403,702 | 1/1922 | Melvin | 60/22 |
| 2,013,861 | 9/1935 | Puigjaner | 60/22 |
| 2,749,085 | 6/1956 | Searcy | 60/22 |
| 2,783,022 | 2/1957 | Salzer | 74/575 |

Primary Examiner—Martin P. Schwadron
Assistant Examiner—H. Burks, Sr.
Attorney—Carlton Hill et al.

[57] ABSTRACT

Wave energy is harnessed through pontoons riding on an ocean surface and guided for vertical movement to drive a vertical transmission bar reciprocably relative to a pair of parallel endless driving chains which are alternately driven by the reciprocating transmission bar to drive respective shafts rotatably, such shafts being coupled drivingly to a machine driving shaft carrying a flywheel for assuring uniform rotary motor power derived from the reciprocating power source motion. Fixed offshore platform and floating platform arrangements are provided.

16 Claims, 8 Drawing Figures

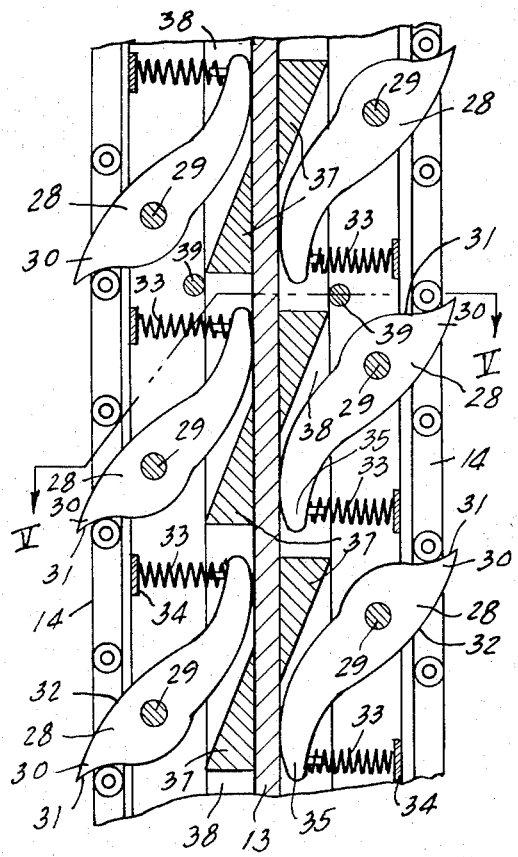
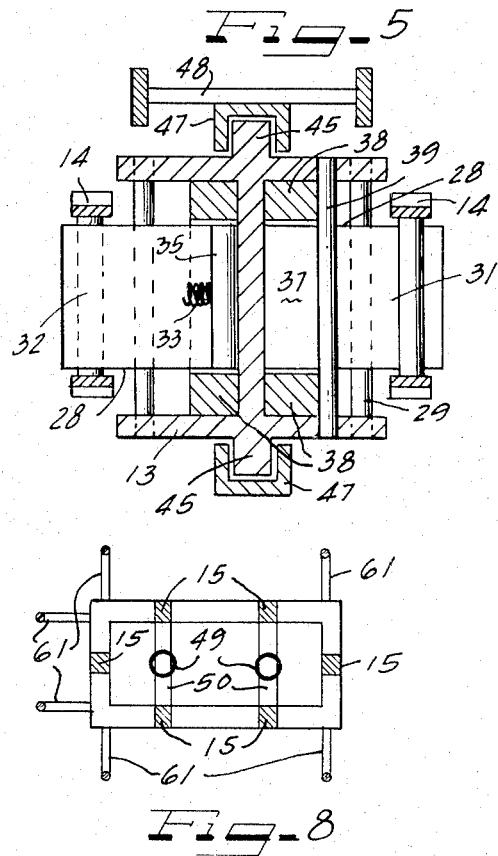
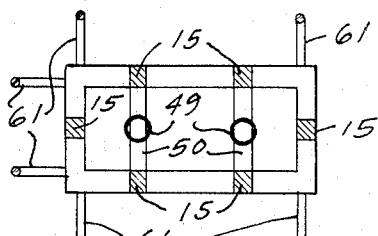
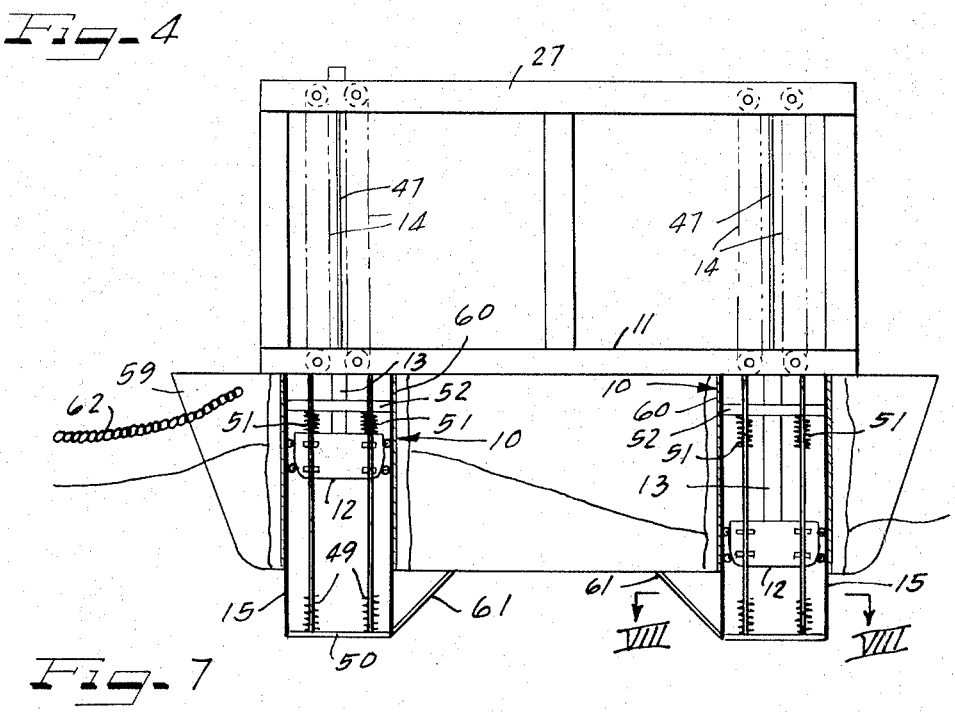

WAVE ENERGY MOTORS

This invention relates to the harnessing of wave energy for useful work, and is more particularly concerned with new and improved wave motors for this purpose.

An inexhaustible and virtually untapped source of energy exists in ocean waves. In many areas of the ocean wave motion is continuous and of a magnitude suitable to be harnessed.

It is, accordingly, an important object of the present invention to provide new and improved means for harnessing wave motion for useful work.

Another object of the invention is to provide a new and improved wave motor which is readily adaptable to operate in association with a fixed offshore platform or in association with a floating platform.

A further object of the invention is to provide a new and improved wave energy motor adapted for use on ships.

Still another object of the invention is to provide a new and improved wave energy motor which is simple and rugged in construction and efficient and reliable in service.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 4 is an enlarged fragmentary vertical sectional detail view through the reciprocal transmission bar and chain structures of the transmission structure;

FIG. 5 is a sectional detail view taken substantially along the line V—V of FIG. 4;

FIG. 7 is a schematic elevational view showing a floating platform or ship for mounting of the wave energy motors according to the present invention; and FIG. 8 is an enlarged fragmentary sectional detail view taken substantially along the line VIII—VIII of FIG. 7.

Figure 1:
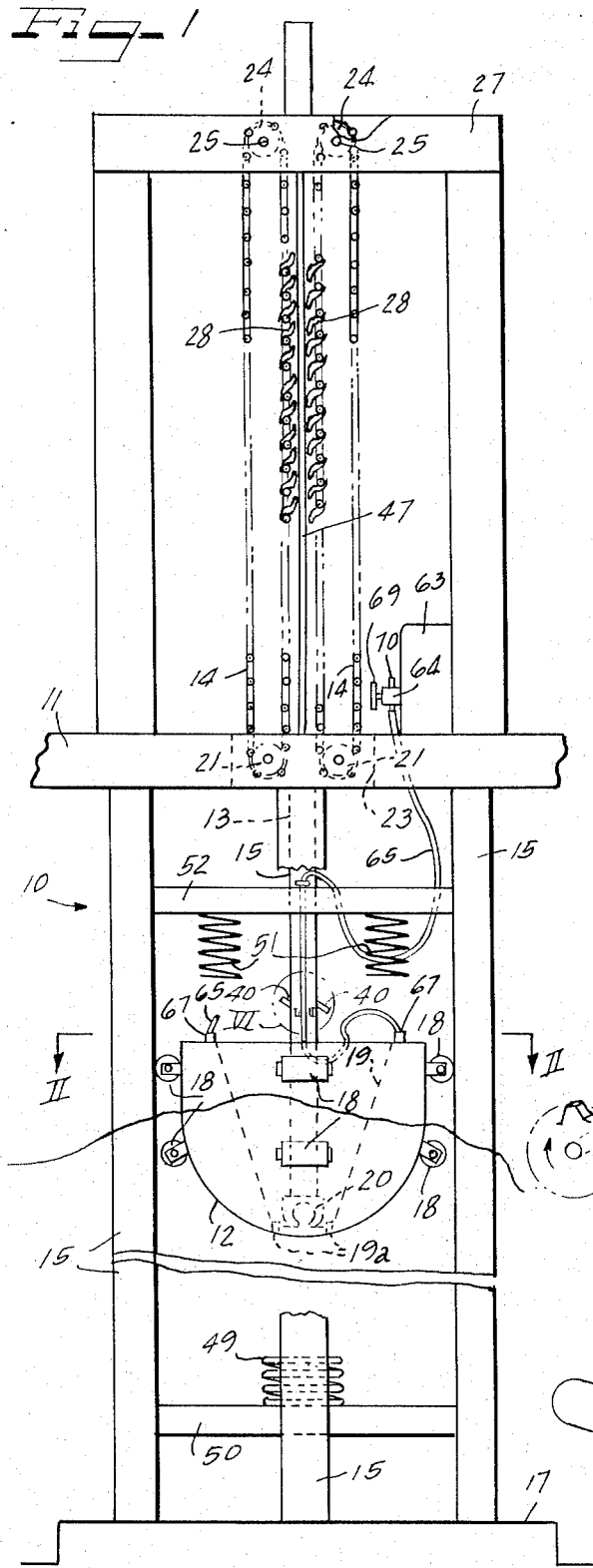
FIG. 1 is a fragmental schematic elevational view of a wave energy motor embodying features of the invention in association with a fixed offshore platform.
Figure 2:
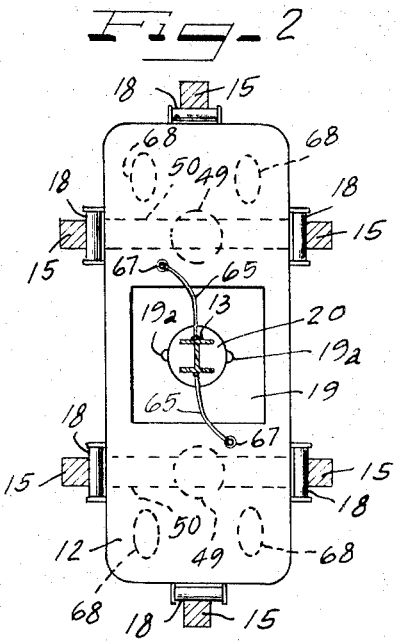
FIG. 2 is a fragmentary transverse sectional view taken substantially along the line II—II of FIG. 1.

On reference to FIGS. 1 and 2, a wave energy motor 10 is mounted in association with a fixed offshore platform 11 which is fixedly mounted in any suitable manner such as on piling, either wood or concrete or steel and at a suitable height above the water to provide clearance above the normal water line for motor operation. A principal element of the motor 10 is an energy harnessing float 12 in the form of a pontoon which supports a vertical upwardly extending transmission bar 13 operatively coupled with transmission driving chains 14 supported on and above the platform 11.

For maximum efficiency, the pontoon 12 is of substantial size being desirably of generally rectangular shape as shown in plan in FIG. 2 and of substantial depth as shown in FIG. 1 and may have a flat top, but a rounded bottom providing, overall, large buoyant surface for efficient wave energy response. Free vertical movements of the pontoon 12 responsive to ocean wave motion are enabled, but means are provided to confine the pontoon within fairly close limits against horizontal travel. For this purpose an open vertical guide frame comprising posts or frame members 15 defines, in effect, a cage about the pontoon between the platform 11 which is supported at a suitable height above normal height of waves 16, and the sea bottom where the lower ends of the posts may be suitably anchored such as in a concrete block 17. Two of the posts 15 may be provided in spaced relation along each longitudinal side of the pontoon and one of the posts 15 at each end. Anti-friction means in the form of sets of freely rotatable rollers 18 mounted on the sides and ends of the pontoon oppose the respective confining posts 15, one of the rollers in each set being located near the top of the pontoon, and a second in spaced relation therebelow and on the curve of the pontoon bottom near juncture with the side wall so that the lower roller is inset slightly relative to the upper roller. This arrangement enables a small range of canting or rocking of the pontoon to accommodate to the roll of the waves. Through this arrangement, the pontoon can move freely vertically, and pitch and roll to a limited extent to ease wave force strain thereon, and the cage provided by the posts is a wide open framework which avoids interference with efficient wave access to the pontoon.

In a desirable form, the transmission bar 13 comprises an H-beam set on end in the center of the pontoon 12. To enable straight vertical reciprocation of the bar 13 as motivated by the pontoon, while permitting the pontoon a range of relative rocking movement, without strain to either the pontoon or the bar, the lower end of the bar is attached as close as practicable to the bottom of the pontoon within a clearance well 19. The walls defining the well taper flaringly upwardly and laterally from the bottom for rocking clearance of the pontoon relative to the pivotally attached bar. For drainage, suitable holes 19a are provided in the bottom of the well. Attachment of the bar to the pontoon is desirably through a rugged universal joint 20 enabling wave-induced rolling motion of the pontoon relative to the bar but maintaining a positive operating connection for both up and down synchronous movements of the pontoon and bar as generated by wave energy.

For power transmission from the bar 13 to the chains 14, means are provided for driving one of the chains in the upstroke of the bar and driving the other of the chains in the downstroke of the bar. To this end, the chains are of the endless link sprocket chain type trained over sprocket gears 21 pivotally mounted on respective driving transmission shafts 22 suitably journalled on the platform 11 at, above, or in a clearance aperture 23 in the platform. From the gears 21, the chains extend in vertical runs and are trained at the upper ends of the runs over respective idler sprockets 24 on respective shafts 25 rotatably journalled on a supporting frame 27, which may be enclosed within a protective housing (not shown). Means for transmitting reciprocal thrust from the transmission bar 13 to the chains 14 comprise respective sets of vertically spaced detents in the form of one way clutch pawls 28 (FIGS. 1, 4 and 5) carried by the bar 13. One of the sets of pawls 28 is drivingly engageable with one of the chains 14 in the upstroke of the bar while the other set of pawls engages drivingly with the other of the chains in the downstroke of the bar, while the non-driving set of pawls releases from and idles relative to its associated chain in each instance. By having the bar 13 in the form of an H-beam section, with the respective oppositely opening channels in the bar facing toward a closely adjacent vertical run of one of the respective chains in each instance, convenient operative pivotal mounting of the sets of pawls 28 is provided for. Means pivotally mounting each of the pawls comprises a respect shaft 29 fixed to and between the flanges of the transmission bar within the respective channel. Each of the pawls 28 is provided with a driving finger 30 adapted to project from the respective beam channel and provided with a desirably concave thrust shoulder 31 which will efficiently engage and retain the crossbar or roller of one of the associated chain links in the driving stroke. In an efficient arrangement, the pawls are located to engage with every second link of the associated chain, and the links are of ample length relative to the thrust finger dimensions of the pawls for ready, efficient, minimum lag coupling engagement of the pawls with the links in the respective driving strokes of the bar 13. As best seen in FIG. 5, each of the pawls is of substantial width and the chain links are of a slightly greater width for effective clearance. From the tip of each of the pawl fingers 30, the outer edge of the pawl slopes as a preferably convex idle cam surface 32 for smoothly idling along the chain link crossbars during return movement of the respective pawls with the bar 13. Although gravity may be relied on for normally biasing the pawls 28 into the operative chain driving position thereof, supplemental bias by means of respective compression springs 33 is desirably provided. Other types of springs such as leaf springs may be used. Each of the springs 33 thrusts between a shoulder 34 on the transmission bar and a heel terminal 35 on the end of the pawl remote from the finger 30 and in the operative chain driving position of the pawl bearing against the web of the bar 13 as a thrust surface.

Means are provided for disabling the respective sets of pawls 28 when necessary for any reason such as for repair purposes anywhere in the system, when it is desired to have the motor run idle, and the like. To this end, a respective disabling wedge 37 is provided for each of the pawls 28. These wedges are normally located free from the associated pawls but are adapted to be driven between the heels 35 of the pawl and the transmission bar web to turn the pawls into idle position in opposition to the biasing springs 33. For unison operation of the disabling wedges 37 for each set of pawls, the wedges are desirably carried fixedly on and between spaced parallel coextensive operating bars 38 which are slidably engaged within the respective reentrant corners within the respective channels of the bar 13 and operatively maintained in such position by means such as transverse retainer bars or pins 39 extending at suitable intervals between and supported by the flanges of the bar across the outer edges of the wedge bars 38.

Figure 6:
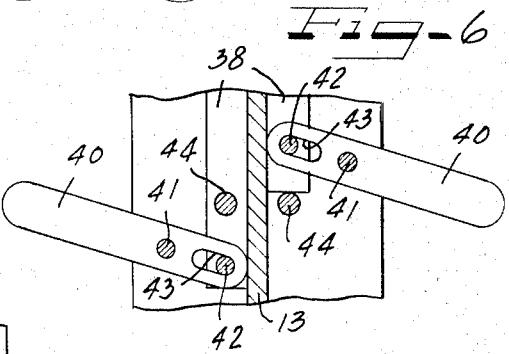
FIG. 6 is an enlarged sectional elevational detail view taken within the circle VI of FIG. 1.

Means for operating the disabling wedge bars 38 comprise, as best seen in FIG. 6, respective lever handles 40 pivotally mounted on and between the flanges of the bar 13 on respective pivots 41 and having operating connection by means of respective pins 42 attached to and between the lower end portions of the bars 38 and extending through a longitudinally elongated coupling aperture 43 in the operating head of the handle. Through this arrangement swinging of the handle 40 in one direction causes the wedges 37 to be shifted through the bars 38 into the inactive position shown in FIG. 4, and swinging of the respective handle in the opposite direction causes the wedges to be driven into pawl-disabling position. Means for maintaining the disabling wedges normally in the inactive position may comprise suitable locking structure such as respective locking pins 44 removably carried by and between the flanges of the bar 13 and interengaging lockingly with the respective bars 38.

Means are provided for guiding the power transmission bar 13 for accurate reciprocal stroking and against any tendency to shift laterally. To this end, the bar is provided with a respective longitudinal runner rib 45 (FIG. 5) along each side slidably engaged in a respective generally U-shaped track bar 47 fixedly vertically mounted to and between the deck 11 and the top of the frame 27. For access purposes, a ladder 48 may be mounted on one of the track bars 47.

Reciprocal driving strokes of the transmission bar 13 must be limited to a range wherein the sets of pawls 28 remain aligned with the respective chains 14 between the sprockets 21 and 24, even though the arrangement is such as to provide for relatively long normal stroking movements. Therefore, safety means are desirably provided for limiting movements of the pontoon 12 to the maximum permissible range. To this end, buffer means in the form of springs 49 (FIG. 1) are mounted on a suitable frame 50 carried by the posts 15 under the pontoon 12 to engage and hold it in the lowest permitted point in its range of movement. The upper limit of movement is defined by buffer means 51 carried by suitable frame structure 52 and represented by springs with which the top of the pontoon are engageable at the uppermost permitted limit of movement. Thereby, in unusual wave motion as may be caused by storm conditions, the pontoon 12 will be controlled to remain within the maximum range.

Figure 3:
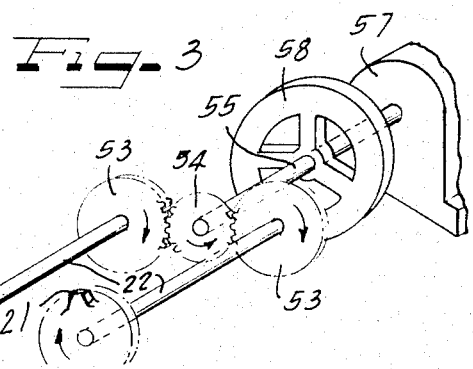
FIG. 3 is a schematic isometric illustration of the drive shaft gear train of the motor.

Power generated in the reciprocations of the transmission bar 13 driving the chains 14 is transmitted by the shafts 22 (FIG. 3) and driving gears 53 thereon to an intermediate gear 54 to drive a shaft 55 which is drivingly connected to a machine 57 to be driven. Such machine may be an electrical generator, a pump, compressor, or the like. To assure steady driving rotary motion of the shaft 55, it desirably carries a suitable flywheel 58.

In FIG. 7 an arrangement utilizing one or a plurality, and in this instance two, of the wave energy motors 10 on a floating platform or ship 59 is depicted. In this instance, each of the motors 10 is mounted to operate within and in relation to a respective vertical shaft well 60 provided through the hull of the floating member 59, with the pontoon 12 guided by the vertical post frame 15 which may, as shown, project below the keel of the floating member 59 to extend the downward range of falling movement of the pontoon with wave motion reflected in the respective well. Stabilizing means in the form of diagonal braces 61 (FIGS. 7 and 8) are desirably connected between the lower end of the frame 15 and the hull of the floating member 59. In this instance, the lower frame structure 50 supporting the buffers 49 is located at the lower end of the frame 15. The deck or platform structure 11 is adapted to be mounted on the top deck of the floating member 59 or may comprise such deck. In this instance the platform 11 is depicted as of a dimension to accommodate both of the motors 10 which are respectively located adjacent to the opposite ends of the floating member 59. Likewise the superstructure frame 27 is depicted as dimensioned to accommodate a power transmission mechanism for both of the motors. A separate superstructure for each of the motors may be provided if preferred. Such superstructure will, of course, be integrated with other superstructure of a ship where the motors or either of them may be employed as a shipboard power generator. Where the floating member 59 comprises merely a captive floating hull, it may be more or less permanently anchored as by means of suitable anchor chains 62. Driving of one or more machines may be effected in similar fashion as explained in connection with FIG. 3. Generally each of the motors is adapted to drive a separate machine. Where such machines comprise electrical generators, suitable take-off cables may be run to a shore installation where the floating member 59 is located offshore for the purpose.

In operation of the wave energy motor 10, upward thrusting of the pontoon 12 and thereby upstroke of the transmission bar 13 is in response to upward or cresting wave motion, the power generated in such stroke being transmitted to and through the appropriate chain 14 by the upwardly driving set of pawls 28. Descending movement of the pontoon 12 is in response to falling wave motion, and the weight of the pontoon 12 plus the weight of the bar 13 causes the downstroke of the bar to impart driving power to the chain 14 which is engaged by the downwardly directed driving pawls 28. There is, accordingly, sequential driving of the two chains and the power generated flows continuously through the transmission gear train to and through the shaft 55 to the engine 57 driven thereby.

At times it may be desirable to disable the motor 10 by immobilizing the pontoon 12. For example, during installation or repair reciprocations of the transmission plunger bar 13 may be undesirable and, further, it may be preferred to have the transmission bar at its low position. Especially in respect to the fixed offshore location of the motor as in FIG. 1, stormy weather may cause wave motion of undesirable magnitude and intensity tending to drive the pontoon to its extreme limits of stroke with possibly damaging force and velocity. Means are therefore provided for readily immobilizing the pontoon 12 by sinking it to the bottom of the frame provided by the members 15 and 50, in this instance to rest on the buffers 49, and wherein the pontoon will be below waterline during violent wave action or whenever it is desired to sink the pontoon to maintain it inactive. By way of example, the pontoon 12 may be equipped to be buoyant for normal operation and to be non-buoyant so that it will sink to the bottom of the frame for disablement. In a desirable arrangement, the hollow interior of the pontoon comprises an air chamber which is adapted to be air-filled for buoyancy to enable normal operation of the pontoon, but which chamber is adapted to be water-filled to render the pontoon non-buoyant. Accordingly, means are provided comprising an air compressor 63 which may be suitably mounted on the deck 11 and is equipped with a control valve 64 from which extends a flexible air conduit 65 suitably connected to the transmission plunger bar 13 below the deck 11 and thence leads to an inlet connection or coupling 67 in the top or deck of the pontoon 12. Suitable loops are provided in the conduit 65, as shown, to accommodate relative movements of the bar 13 and the compressor 63 and the coupling 67. Through this arrangement, air under pressure is delivered to the air chamber within the pontoon 12 and renders the pontoon 12 buoyant. For maximum efficiency, especially where the pontoon 12 is of substantial size, the system is preferably provided with a plurality of the air conduits 65 as best seen in FIG. 2, with the communication couplings 67 located at spaced points best suited to attain uniform results.

Preferably the arrangement is such that the pontoon 12 can be quickly activated or deactivated. For deactivation, the bottom of the pontoon is provided with one or more, in this instance four, openings or ports 68 which may remain permanently open so that the pontoon can be filled with water or evacuated at will. By proper placement of the ports 68 such as adjacent to the opposite ends of the pontoon bottom and by spaced pairs, uniform blowing or evacuation and water filling are attained. Assuming that the pontoon 12 is water-filled and sunk, driving of compressed air thereinto through the ducts 65 blows the water from the pontoon chamber out through the ports 68 and establishes buoyancy in the pontoon. Full buoyancy and maximum responsiveness of the pontoon to wave energy is attained when the water has been evacuated from the pontoon chamber fully to the ports 68. By controlling the degree of evacuation, and thus the ratio of water to air within the pontoon chamber, at least some control can be exercised over pontoon reaction to wave energy and accordingly to the length and speed of the transmission bar reciprocal working strokes.

Means are provided for controlling the valve 64 to serve the dual functions of compressed air delivery from the compressor 63 for charging the pontoon 12 and alternatively for bleeding air from the pontoon. To this end, the valve 64 may be of any preferred two-way operating type such as a rotary valve operable by means of a lever or handwheel 69 so that in one operative condition of the valve as determined by the control member 69, the air conduits 65 are connected with the compressor 63 for charging the pontoon 12. In another operative condition of the valve 64 as determined by the member 69, the ducts 65 are shut off from the compressor 63 and a bleed-off port 70 opened into communication with the air conduits 65 for discharge of air from within the pontoon by hydraulic pressure of water entering through the pontoon ports 68 and driving the air from the pontoon chamber through the couplings 67, the conduits 65 and the valve 64 to atmosphere through the bleed-off port 70. By reason of the mass of the pontoon 12 and the transmission bar 13, displacement of air by the water entering the ports 68 will occur rapidly or as may be controlled by and through the valve 64.

Additional advantages accruing from the compressed air buoyancy system for the pontoon 12 are that buoyancy can be controlled to remain substantially constant and there is no leakage problem to interfere with buoyancy since by suitable pressure regulation of the compressor 63, air pressure can be efficiently regulated within the pontoon chamber. Recovery and return movement of the pontoon 12 during wave action descent is improved by hydrodynamic compression of the chamber air within the pontoon by virtue of the freedom of movement of water through the bottom ports 68 in the pontoon.

It will be understood that variations and modifications may be effected without departing from the spirit and scope of the novel concepts of this invention.

I claim as my invention:

1. In a wave energy motor:
   a pontoon adapted to ride on and follow the rise and fall of ocean waves;
   a vertical power transmission plunger mounted on and vertically reciprocal in up and down strokes with the rise and fall of the wave-driven pontoon;
   power transmission means including a pair of endless respectively unidirectional driving chains operatively located with said plunger therebetween;
   and one way clutch detent means on said plunger operative to engage with and drive one of said chains in the upstroke and operative to engage with and drive the other of said chains in the downstroke, said detent means releasing from said one chain during the downstroke of the plunger and releasing from said other chain during the upstroke of the plunger.

2. In a wave energy motor according to claim 1, means for guiding said pontoon in its rising and falling motion comprising a frame having vertical bars in clearance relation to the pontoon and confining the pontoon against displacement from a vertical path of movement, anti-friction means carried by said pontoon in opposition to said guiding frame bars permitting limited range of rocking and pitching movements of the pontoon, and means providing a universal joint connection of the plunger to the pontoon.

3. In a wave energy motor according to claim 2, said pontoon having a well opening upwardly from its bottom, said universal connection being on said bottom within said well, and the well providing a clearance about the plunger enabling free pitching and rocking movement of the pontoon relative to the plunger.

4. In a wave energy motor according to claim 2, said antifriction means comprising horizontal rollers carried by said pontoon in vertically spaced relation and with upper rollers offset toward said guiding frame bars relative to lower rollers to facilitate said movements of the pontoon.

5. A wave energy motor according to claim 1, including a free floating member carrying said power transmission means and having guide means for said pontoon extending below water line.

6. In a wave energy motor according to claim 5, said guide means comprising guide frame structure extending below said floating member and including bracing means extending to and connected with said member.

7. In a wave energy motor according to claim 6, said floating member comprising a hull, said hull having a well vertically therethrough, said guide means extending through said well.

8. In a wave energy motor according to claim 1, said chains having vertical runs parallel to each other and to said plunger, said plunger having said detent means on respectively opposite sides thereof for engagement alternately and separably with said chains in the reciprocations of the plunger.

9. In a wave energy motor according to claim 8, said detent means comprising pawls, said plunger comprising an H-beam section, and means pivotally mounting said pawls in channels defined by the beam section.

10. In a wave energy motor according to claim 9, means normally yieldably biasing the pawls into chain-engaging relation.

11. In a wave energy motor according to claim 9, means for selectively disabling said pawls.

12. In a wave energy motor according to claim 11, said disabling means comprising respective disabling wedges and means for operating said wedges including wedge-carrying bars selectively reciprocably mounted within said channels and having means for selectively operating the same.

13. In a wave energy motor:
    a pontoon adapted to ride on and follow the rise and fall of ocean waves;
    a vertical power transmission plunger mounted on and vertically reciprocal in up and down strokes with the rise and fall of the wave-driven pontoon;
    power transmission means including a pair of endless driving chains operatively located with said plunger therebetween,
    detent means on said plunger operative to drive one of said chains in the upstroke and the other of said chains in the downstroke;
    said chains having vertical runs parallel to each other and to said plunger;
    said plunger having said detent means on respectively opposite sides thereof for engagement alternately and separably with said chains in the reciprocations of the plunger;
    said detent means comprising pawls;
    said plunger comprising an H-beam section;
    means pivotally mounting said pawls in channels defined by the beam section;
    and means for selectively disabling said pawls comprising respective disabling wedges and means for operating said wedges including wedge-carrying bars selectively reciprocably mounted within said channels and having means for selectively operating the same.

14. In a wave energy motor according to claim 1, a pair of separately rotatably mounted shafts having sprockets co-rotatable therewith, said one chain being meshed with one of said sprockets and said other chain being meshed with the remaining sprocket, said plunger and detent means driving said chains in respectively opposite directions and thereby driving said sprockets and said shafts in the same rotary direction, respective gears mounted co-rotationally on said shafts, a driven gear meshing with both said gears and mounted co-rotatably on a shaft having a fly wheel thereon, said shaft having the fly wheel being drivingly connected to a maching driven thereby.

15. In a wave energy motor:
    a hollow pontoon adapted to ride on and follow the rise and fall of ocean waves and provided with a buoyancy air chamber therein;
    power transmission means operated in the up and down wave-effected movements of the pontoon;
    means for charging the pontoon with buoyancy air;
    said pontoon having a bottom provided with at least one permanently open port so that the pontoon can be filled with water or evacuated at will by controlling internal pressure within the pontoon;
    and means for controlling said charging means including means for opening the interior of the pontoon to atmosphere to bleed air from said chamber under pressure of water entering the pontoon through said permanently opened port, said bleeding means being adapted to be closed to permit the charging means to fill the pontoon with air to said port for buoyancy and in the filling driving water out of the pontoon through said port.

16. In a wave energy motor according to claim 15, said pontoon bottom having a plurality of said ports located at various spaced positions in said bottom whereby hydrobynamic compression of air in the pontoon improves recovery and return movement of the pontoon during wave action descent.

* * * * *